United States Patent
Jacquet (10) Patent No.: US 6,765,755 B1
(45) Date of Patent: Jul. 20, 2004

(54) ANTI-ABRASIVE READING HEAD

(75) Inventor: Jean-Claude Jacquet, Orsay (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/049,910

(22) PCT Filed: Aug. 11, 2000

(86) PCT No.: PCT/FR00/02306
§ 371 (c)(1),
(2), (4) Date: Feb. 20, 2002

(87) PCT Pub. No.: WO01/15155
PCT Pub. Date: Mar. 1, 2001

(30) Foreign Application Priority Data

Aug. 20, 1999 (FR) .............................................. 99 10671

(51) Int. Cl.[7] .......................... G11B 5/127; G11B 11/10

(52) U.S. Cl. .................. 360/114.05; 428/611; 428/632; 428/635; 428/336; 428/692

(58) Field of Search ....................... 360/114.05, 114.08, 360/59; 359/280, 282, 484; 369/112.1, 13.01, 13.05, 13.02, 13.17; 428/611, 621, 622, 632, 635, 336, 692

(56) References Cited

U.S. PATENT DOCUMENTS

| 4,660,175 A | * | 4/1987 | Strand .......................... 365/113 |
| 5,689,391 A | * | 11/1997 | Maurice ................. 360/114.08 |
| 5,961,848 A | | 10/1999 | Jacquet et al. |

FOREIGN PATENT DOCUMENTS

| EP | 0 436 424 | | 7/1991 | |
| EP | 0 527 670 | | 2/1993 | |
| FR | WO 91/10234 | * | 7/1991 | ............ G11B/11/10 |
| JP | 02-050309 | * | 2/1990 | ............ G11B/5/31 |

* cited by examiner

Primary Examiner—Paul Thibodeau
Assistant Examiner—Kevin Bernatz
(74) Attorney, Agent, or Firm—Oblon, Spivak, McClelland, Maier & Neustadt, P.C.

(57) ABSTRACT

A magnetooptic read head including a magnetooptic transducer with a multilayer structure with at least one thin magnetic layer with a magnetooptic effect, at least one layer made of nonmagnetic material and having a predetermined wear coefficient, and a layer with good magnetic permeability for closing a magnetic circuit. The layer with good magnetic permeability includes alternating first sublayers made of a magnetic material with good magnetic permeability and second sublayers made of a material having a wear coefficient substantially equivalent to the wear coefficient of the layer made of a nonmagnetic material.

16 Claims, 7 Drawing Sheets

Figure 3:
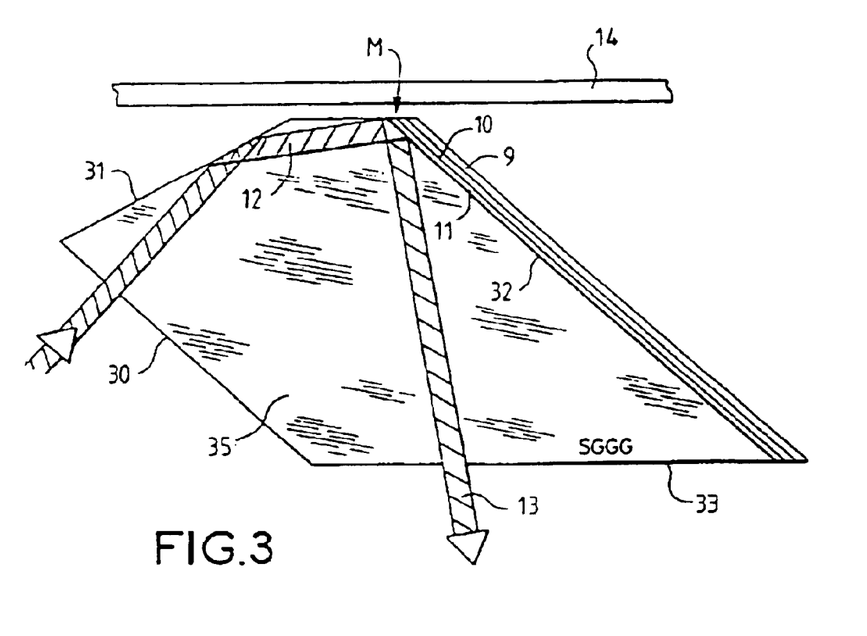

FIG.11 ary prism. It should be noted that the faces 30 and 33 may be coated with a layer of antireflective material made of $SiO_2$ for example.

ANTI-ABRASIVE READING HEAD

FIELD OF THE INVENTION

The present invention relates to a magnetooptic read head.

DISCUSSION OF THE BACKGROUND

To read a magnetic medium, a known type of magnetooptic head uses a Faraday effect and/or a Kerr effect. These effects consist in magnetizing a magnetooptic material, such as garnet, by the magnetic flux produced by the magnetic medium, and in detecting this magnetization by means of the rotational power it has on polarized light.

The physical principle exploited is the magnetooptic effect known by the name of Kerr rotation or Faraday rotation. In this effect, the polarization state of an electromagnetic wave reflected from a magnetooptic medium or passing through it, is modified. This state depends on the direction of magnetization of the medium. Since the read pole consists of a material of this type, the polarization of a laser beam reflected therefrom is altered by the variations of magnetization induced by the magnetic medium. This modulation is then transformed into variations of light intensity which are then measured using a photodetector thus making it possible to reconstruct the information written on the magnetic medium. Therefore the magnetic information is no longer carried by an electric current but by an electromagnetic wave.

Figure 1:
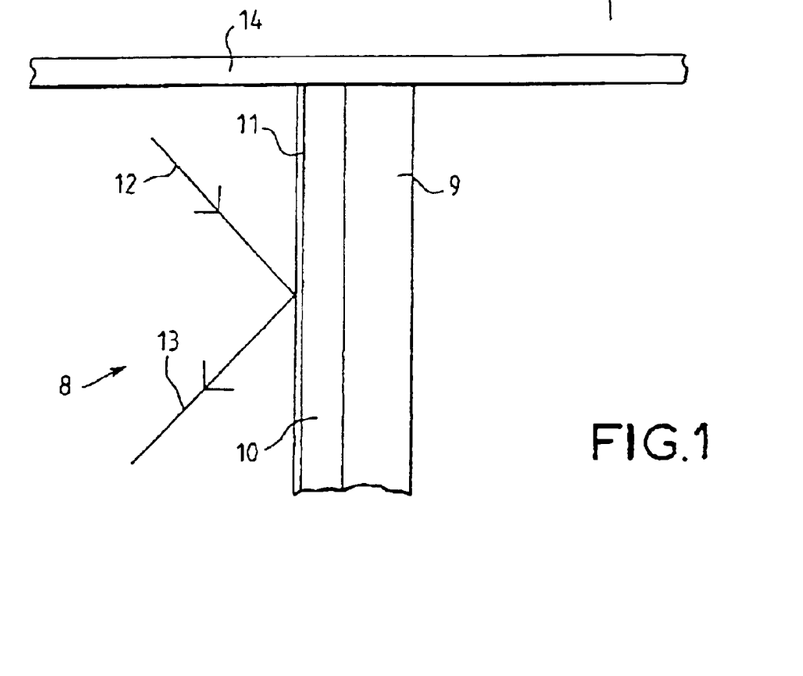
FIGS. 1 to 4 show magnetooptic read heads according to the prior art and as described above.

A read head of this type has been described in French patent No. 2 656 732. FIG. 1 shows the simplified diagram of one embodiment of this head.

It comprises a layer 9 of magnetic material with good magnetic permeability, of a thickness which can reach several microns, for example.

A layer 10 of nonmagnetic material, of a thickness for example between 50 and 3 000 nm, and typically about 300 nm, and a thin layer 11 of magnetic material forming the layer with a magnetooptic effect (Kerr effect for example) are formed on the layer 9. The thickness of the layer 11 is, for example, between about 10 and 200 nm. An oblique incident optical beam 12 arrives on the layer 11, which reflects a beam 13. The layers 9 to 11 are polished on one of their sides, for example perpendicularly to their main surface, and the magnetic tape 14 to be read is applied to the surface polished in this way.

The head of FIG. 1 may be easily produced in a single layer deposition operation, and it is not absolutely necessary to etch the deposited layers in order to produce multitrack read heads.

Figure 2:
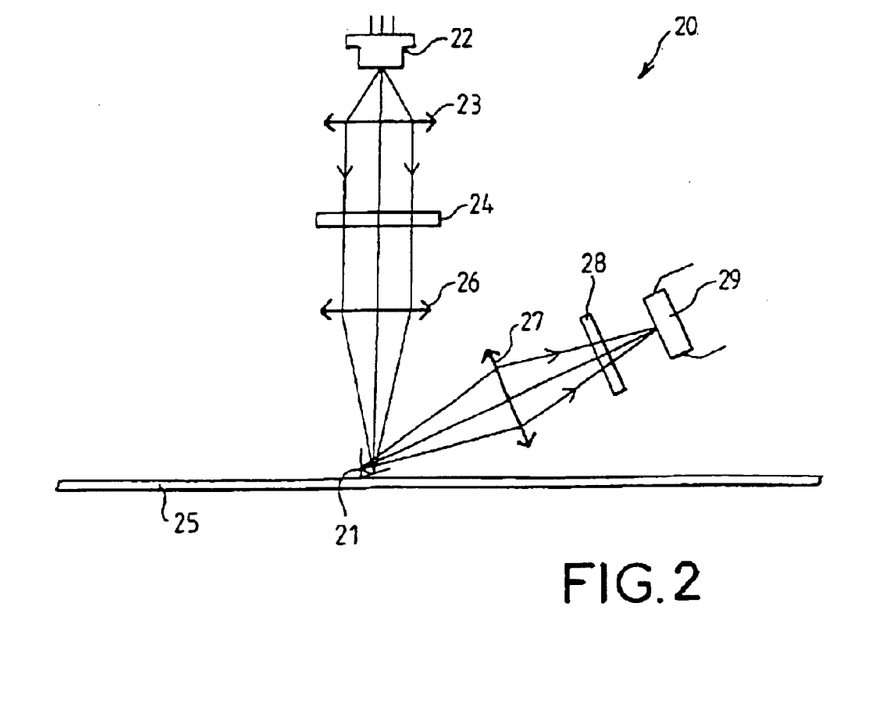

FIG. 2 shows a multitrack magnetooptic read system 20 comprising a read head according to the invention. The main benefit of using a Kerr effect head for reading a multitrack recording is due to the principle of active reading, the performance of which is not disadvantaged by a low play speed of the tape to be read. Upstream of the Kerr effect head 21, the system 20 comprises a point light source 22, preferably a laser diode, a collimating objective 23, a device 24 comprising a polarizer serving to make the polarization of the light beam passing through it perpendicular to the direction of movement of the tape 25 to be read, and a cylindrical lens 26 oriented so as to focus the beam collimated by the objective 23 along a line perpendicular to the direction of movement of the tape 25.

The head 21 comprises, as stated in the present description, a Kerr effect sensor and, as necessary, an optical reflector.

Downstream of the head 21, the system 20 comprises an optical imaging device 27; a device 28 comprising an analyzer and, where necessary, a phase compensator; and a linear optical sensor 29, the active zone of which is the optical conjugate, by means of the optical system, of the line illuminated on the Kerr effect head. This optical sensor comprises, for example, a CCD linear array. Since the magnification of the downstream part of the system 20 is typically about one, it is possible advantageously to produce it in integrated optics.

FIG. 3 shows one embodiment of a magnetooptic read head according to the invention in which the various layers of FIG. 1 are produced on a prism 35 made of a material transparent to the wavelength of the read beam. This material is, for example, made of GGG (galidonium gallium garnet). The various faces 30 to 33 of this prism are oriented such that the read beam 12 penetrates without reflection into the prism and is reflected on the face 32 bearing the magnetooptic layer 11 of the head, near to the read zone of the magnetic tape 14 to be read. The exit face 33 is oriented such that the beam 13 exits without reflection from the prism. It should be noted that the faces 30 and 33 may be coated with a layer of antireflective material made of $SiO_2$ for example.

The layers 9, 10, 11 correspond to the layers bearing the same references in FIG. 1 are made on the face 32 of the prism.

In this type of known magnetic head, the magnetooptic layer 11 is made of sendust ($Fe_xSi_yAl_z$), the airgap layer 10 is made of $Si_3N_4$ or $Al_2O_3$ and the magnetic layer 9 is made of sendust.

By way of example, at the present time, a magnetooptic read head may consist of a stack of the following materials:
- a sendust layer 11, with a thickness of 30 nm and which acts as a read pole,
- a silicon nitride layer with a thickness of 180 nm,
- a copper layer with a thickness of 50 nm these two layers acting as a magnetic and optical airgap layer 10.
- a sendust layer 9 with a thickness of 1 $\mu$m making it possible to close the flux and acting as magnetic shielding,
- a layer of alumina or of $Si_3N_4$ or of any other hard nonmagnetic material with a thickness of 2 $\mu$m can be provided to protect the assembly.

All of this is deposited on a garnet substrate.

Figure 4A:
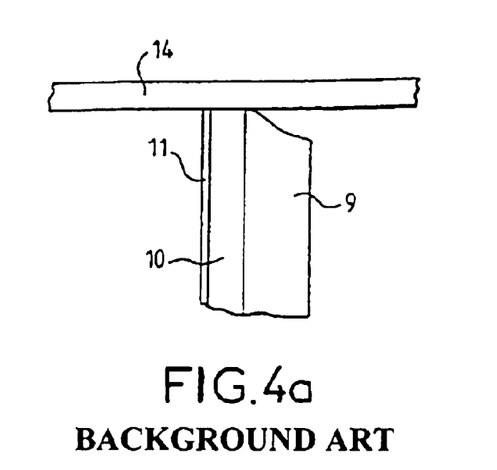
Figure 4B:
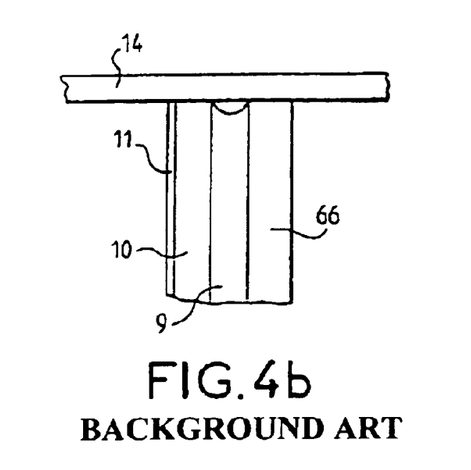

These materials of a very different nature all have different mechanical properties. Thus, we have a combination of hard materials (garnet, $Si_3N_4$, $Al_2O_3$) and of soft materials (sendust, copper). This construction of materials with very different hardnesses is extremely penalizing in terms of component service life. This is because, on contact with the tape, we observe a phenomenon of differential wear between the hard and soft materials with the appearance of a recess of about 100 nm in the less hard materials, this recess being mainly located on the layer 9 (see FIG. 4a). This wear is shown in FIGS. 4a and 4b. Where the layer 9 is covered with a layer 10b of hardness greater than that of the layer 9, wear of the sort shown in FIG. 4b may occur. This wear may be substantial at the end of only a few hundred hours of use, while it is desired to have from 5 000 to 30 000 hours of operation depending on the intended application. This recess results in a signal loss of about 6 dB at 1 $\mu$m of electromagnetic wavelength due to the space created and the loss of resolution, the head passing progressively from bipolar operation where the resolution is determined by the gap width to monopolar operation where the resolution is then determined by the extent of the active zone of the read pole.

It is then impossible to recover the signal, the part in contact being irreparably damaged and only reforming the flat would allow this signal to be recovered.

In magnetoresistive read/write heads, the current solutions propose depositing a layer of a hard material on the front of the head. However, this solution is demanding and expensive in terms of technical production (the hard materials being difficult to produce), and generates space losses of about 3 to 4 dB at 1 µm (for 60 nm deposited).

The invention aims to solve this wear problem.

SUMMARY OF THE INVENTION

The invention therefore relates to a magnetooptic read head, characterized by the fact that it comprises a magnetooptic transducer with a multilayer structure with at least one thin magnetic layer with a magnetooptic effect, at least one layer of a nonmagnetic material and having a predetermined wear coefficient and a layer with good magnetic permeability for closing a magnetic circuit, and in that the layer with good magnetic permeability comprises alternating first sublayers made of a magnetic material with good magnetic permeability and second sublayers made of a material having a wear coefficient substantially equivalent to said wear coefficient of the layer made of a nonmagnetic material.

BRIEF DESCRIPTION OF THE DRAWINGS

The various objects and characteristics of the invention will become more clearly apparent in the following description provided by way of example and in the appended figures which show.

DESCRIPTION OF THE PREFERRED EMBODIMENTS

Figure 5:
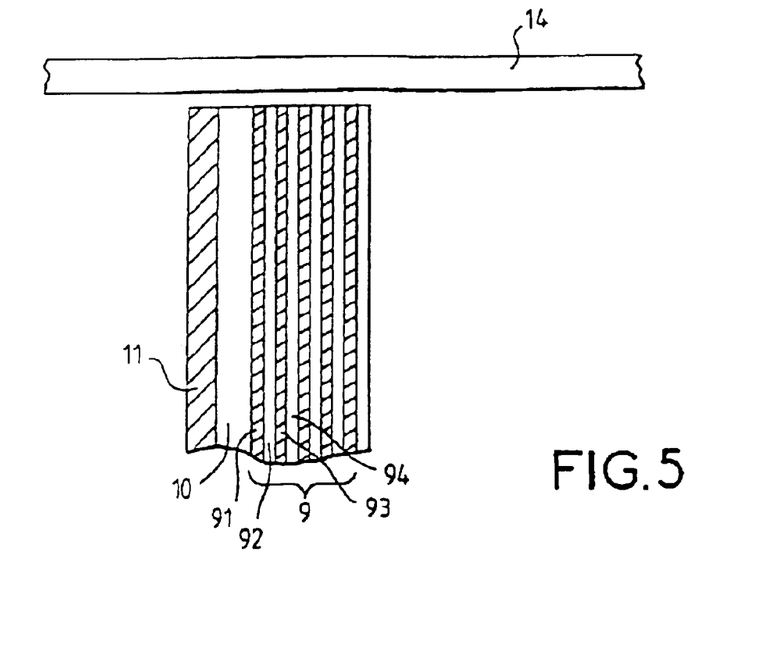
FIG. 5 shows a simplified example of a magnetooptic read head according to the present invention.

A simplified example of a magnetooptic read head according to the invention will first of all be described with reference to FIG. 5.

This read head comprises, as described above, a layer 11 made of a material having magnetooptic properties (Kerr effect and/or Faraday effect), an airgap layer 10 made of a nonmagnetic material, a layer 90 made of a magnetic material having good magnetic permeability in order to allow the magnetic flux induced by the magnetic medium 14 to flow and to be closed by the layers 11 and 9.

According to the invention, the layer 9 consists of a stack of sublayers (such as 91, 93) made of a material with good magnetic permeability alternating with sublayers (such as 92, 94) having a wear coefficient substantially equivalent to that of the airgap layer 10. Preferably, this wear coefficient is small.

Preferably, the sublayers made of a material with good magnetic permeability are made of a material similar to that of the layer 11. The sublayers made of a material with a wear coefficient equivalent to that of the layer 10 are made of a material similar to that of the airgap layer 10.

In this way, the layers 9 and 10 will wear uniformly and the wear phenomenon of FIG. 4 will not occur.

Figure 6:
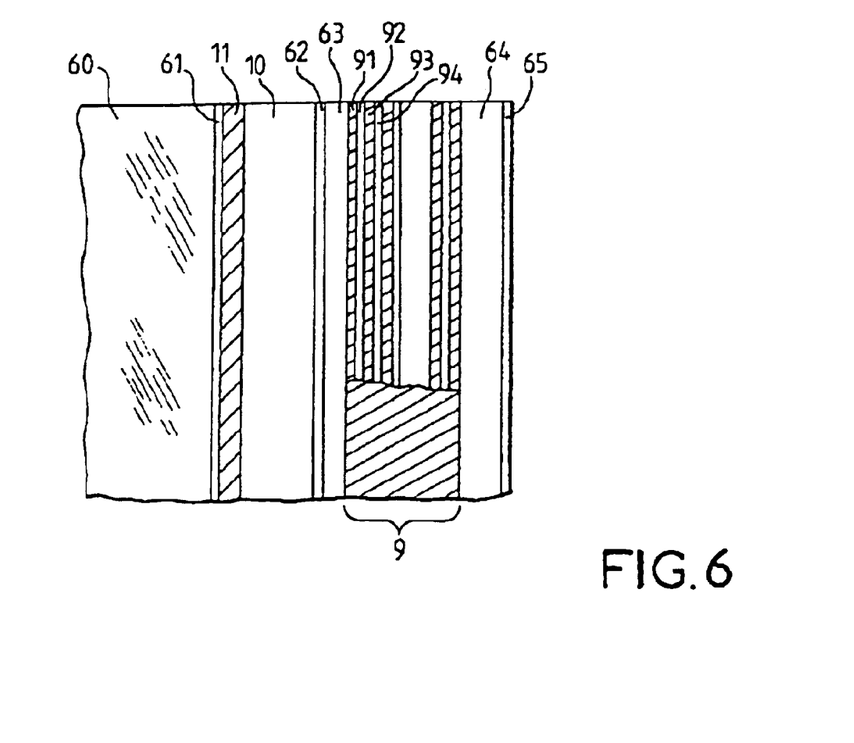
FIG. 6 shows an exemplary embodiment of the various layers of the read head of FIG. 5.

FIG. 6 shows an exemplary embodiment of a read head of this type. According to this example, the layer 11 is made of sendust ($Fe_xSi_yAl_z$) with a thickness of about 25 nm, the airgap layer 10 is made of silicon nitride ($Si_xN_y$) with a thickness of about 200 nm and the layer 9 consists of alternating layers of sendust of 30 nm thickness and of layers of silicon nitride of 20 nm thickness. For example, the layer 9 may consist of about thirty layers of sendust and about thirty layers of silicon nitride.

It will therefore be seen that, according to the invention, in order to reduce the problems of shrinkage of the second pole (layer 9), we start from the observation that the value thereof depends on the if thickness of the magnetic material, the shrinkage decreasing as the thickness decreases. Thus, the smaller the thickness of the material in contact with the tape, the more the wear of this material will be reduced. This explains why the layer 11 is much less affected by this phenomenon, its thickness of 20 nm (compared to 1.5 µm) being less than the mean size of the abrasive particles, and acts as a filter for the abrasive particles transported by the tape. We therefore propose to produce the second pole by alternating a material of a hardness comparable with the substrate (such as $Si_3N_4$ for example), with magnetic layers of a thickness x which are small enough to sufficiently reduce this differential wear to an acceptable level. In this way we produce, on the scale of abrasive phenomena, a mechanically hard magnetic material. The number of periods n is defined such that the product nx is equal to the thickness of magnetic materials needed in order that the second pole can continue to fulfill its role of closing the flux and of magnetic shielding.

The choice of materials is not limiting (instead of $Fe_xSi_yAl_z$ in particular, this could be $Fe_xTa_yN_z$ or any other magnetic material).

Under these conditions, the invention intends that preferably the thickness of the softest material (sendust) is less than the mean size of the abrasive particles due to the roughness of the tape and to the dust generated by the latter. The hardness of the material thus produced will be that of the hardest material. Only the particles of a size less than this thickness will be able to tear matter from the soft material. Furthermore, the depth which will be hollowed out will be about this thickness.

The various thicknesses s and n to be given to the two materials of the layer 9 (sendust and $Si_3N_4$) will be the compromise which will allow the shrinkage of the layer 9 to be reduced sufficiently without altering the magnetic properties required for the layer 9 and which will allow correct operation of the system.

The latter will then simultaneously have good magnetic properties (high saturation magnetization, low coercive field, well controlled anisotropy, etc.) and a hardness or abrasion resistance greater than that of the basic magnetic material. In this way, we combine the mechanical hardness properties of $Si_3N_4$ with the magnetic property of sendust and produce a material whose resistance to abrasion phenomena can be set by varying the relative thicknesses of the two materials present (up to a possible 5 nm for the magnetic material).

Furthermore, as is shown in FIG. 6, the read head may have additional characteristics.

In particular, the magnetooptic layer 11 can be produced on a substrate 60 made of GGG with an intermediate adhesive layer 61. Furthermore, a reflective layer 63 may be provided between the airgap layer 10 and the assembly 9 of alternating layers 9, the light of the read beam not all being reflected by the layer 11. A purpose of this reflective layer is to increase the reflection of the fraction of the beam having passed through this read pole. The index of the airgap layer is chosen such that the reflected beams are superimposed while being in phase.

Finally, a protective layer 64 of a few micrometers thickness made of silicon nitride is provided on the layer stack 9.

Figure 7A:
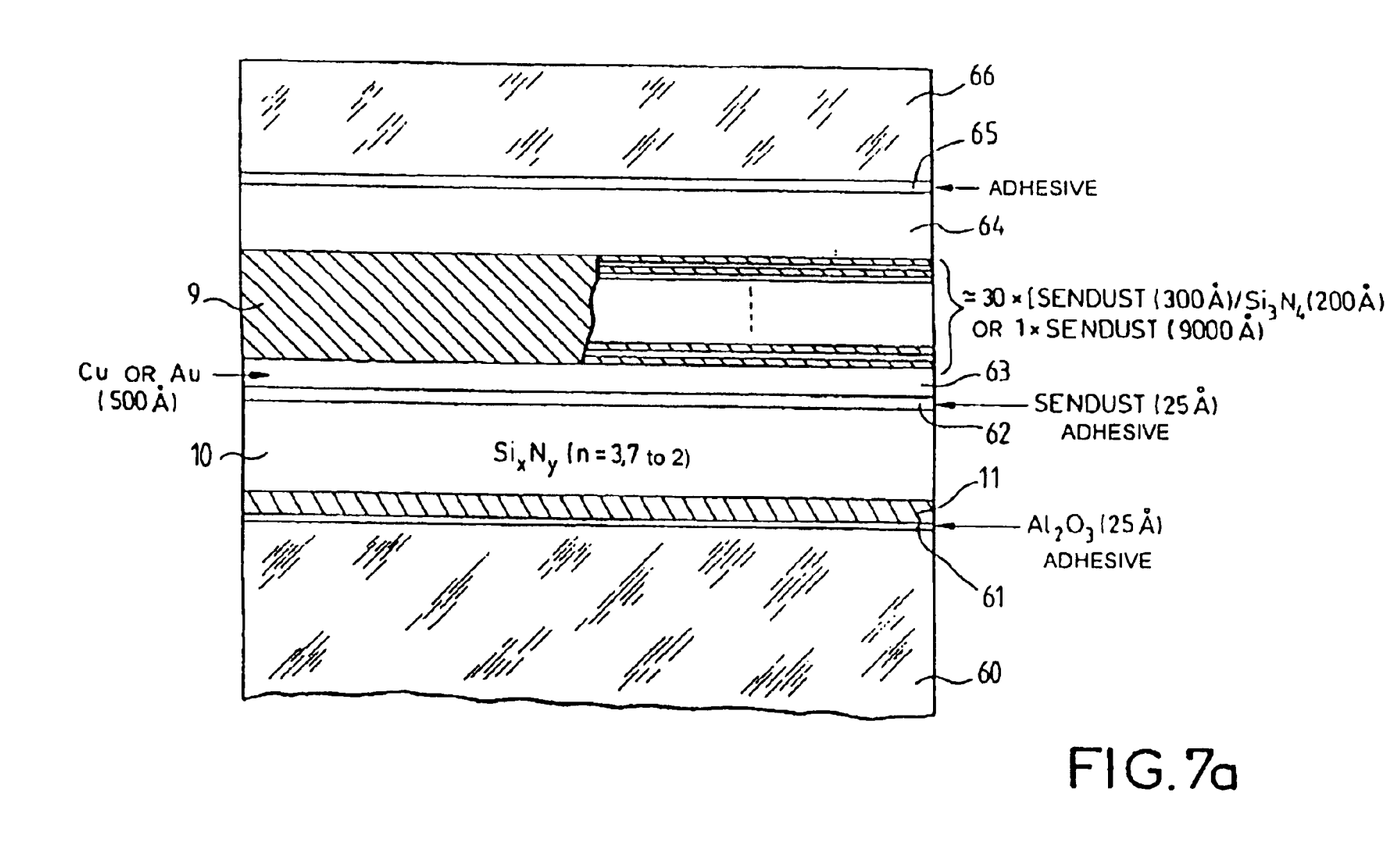
FIGS. 7a and 7b show a more complete example of a read head according to the present invention.
Figure 7B:
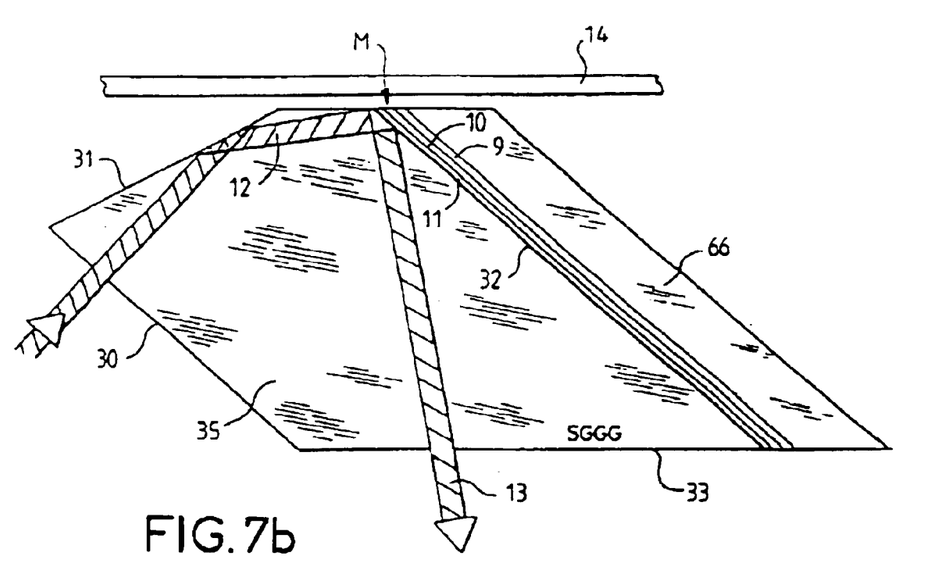

By way of example, a detailed embodiment corresponding to FIG. 7 makes it possible to obtain a read head, the various layers of which have the following characteristics:

substrate 60: made of GGG adhesive layer 61: made of $Al_2O_3$, 2.5 nm thickness magnetooptic layer 11: made of sendust, 25 nm thickness airgap layer 10: made of $Si_xN_y$, of index n between 2 and 3.5 and of 200 nm thickness adhesive layer 62: made of sendust, 2.5 nm thickness reflective layer 63: made of copper or of gold, 50 nm thickness magnetic layer 9: stack of a few tens (30 for example) of layers of sendust (thickness between 10 and 50 nm, for example 30 nm) alternating with a few tens (30 for example) of layers of $Si_xN_y$ of a few tens of nm, 20 nm for example protective layer 64 made of $Si_xN_y$ with a thickness of a few $\mu$m (1 to 5).

We will now describe an exemplary manufacturing method of a read head of this sort. This method comprises the following three main phases:

the deposition of the various magnetic, dielectric and reflective layers, which make it possible to produce the magnetic head and the Fabry-Perot resonant optical structure;

the deposition of the protective $Si_3N_4$ layer of a few $\mu$m thickness (1 to 5) which is followed by annealing in the magnetic fields of the layers;

the cutting, the polishing and the antireflective and protective treatments of the various faces of the prism forming the component.

In the present technology, all the layers are deposited by sputtering in a chamber whose vacuum pressure is about a few tens of nanotorr. This chamber makes it Fit possible to produce Coatings by DC and RF, magnetron and diode sputtering, it being possible to produce these coatings in a magnetic field. The targets have a diameter of 100 mm and the coating distance is 15 cm which makes it possible to deposit layers whose thickness has a homogeneity of about 2 to 3% on wafers with diameters of 2 inches.

The choice of substrate on which the coatings are produced is important. Its position as optical (coupling of light in the read pole) and mechanical (contact with the tape) interface and the role of radiator that it must provide (removal of heat deposited by the laser source) impose a number of restrictions on the physical properties. These restrictions are:

to transmit a maximum of light to the read pole and to the photodetector, therefore to be transparent to the laser wavelength used;

not to modify the polarization state of the electromagnetic wave when it passes through the substrate therefore to be slightly birefringent;

to efficiently remove the heat resulting from the absorption, by the magnetooptic medium, of the incident electromagnetic wave and which degrade the magnetic properties of the read layer, therefore to be a good heat conductor;

to prevent the flat wearing too quickly, therefore to be hard enough;

to be easily machinable and to have a chemical-mechanical resistance compatible with the conditions of use of the system.

All of these restrictions may lead to choosing a substrate made in a single crystal of the garnet family, for example a garnet of generic formula $Gd_3Ga_5O_{12}$.

The coatings are produced on substrates, the two faces of which are already polished. These faces have a roughness of about 5 Å. The substrates are 2 inches in diameter and have a thickness of 3 mm. There are also substrates of 3 inches diameter which have the same physical characteristics, particularly with regard to the homogeneity of the optical properties.

Before carrying out the coating sequence, the substrate should be cleaned. The various cleaning stages are as follows:

The substrate is immersed in three successive solutions of trichloroethylene, acetone and propanol. Each of these immersions lasts for 3 minutes. The immersions are at a temperature of 60° C. and are agitated by ultrasound. After this chemical-mechanical cleaning, the substrate is introduced into the coating chamber. Inside the chamber, before starting to deposit the layers, we carry out a final cleaning by plasma etching. We can then launch the sequence for depositing various layers forming the stack.

The deposition method starts by depositing an aluminum layer of 2.5 nm thickness. The role of this layer is to provide adherence for the following layer on the substrate.

The first magnetic pole (layer 11), called a read pole and off which the laser beam is reflected, is then deposited. The material used to produce this layer is sendust, its thickness is 25 nm. This layer has a dual it function: on the one hand, it must efficiently sense the magnetic field generated by the tape, on the other hand, it must convert the magnetic variations as efficiently as possible into polarization variations. This layer must therefore possess correct magnetic properties and have as high a magnetooptic coefficient as possible. The deposition conditions and the chemical composition of the material therefore have to be suitable to meet these requirements.

Next, a dielectric layer and a reflective layer of copper or of gold are deposited. This set of layers also has a dual function. Not only must it act as a magnetic gap, but also as a Fabry-Perot resonant optical structure, the role of this structure being to improve the coupling of the incident wave with the magnetooptic layer and to recover the Faraday rotation generated as the electromagnetic wave passes through this layer. Thus, the physical and geometrical characteristics of these two layers define the read density and the quality of resonance. Careful choice of the indexes and of the thicknesses of the various layers makes the optimum adjustment of these two parameters possible. In the case of a head having to reread 0.4 micron bits, for a laser wave of 780 nanometers with an angle of incidence of 45°, the dielectric layer must have a thickness of 1900 Å and a refractive index close to 2, it being possible for the reflector to be a copper or gold layer of 500 Å thickness. The dielectric layer is produced from a silicon target, the deposition being carried out in the presence of a mixture of nitrogen and of argon. In this way, we obtain a compound close to silicon nitride, the silicon and nitrogen proportions of which depend mainly on the nitrogen concentration.

Next comes the deposition of the second pole (layer 9) making it possible to close the flux and also acting as a magnetic shield. The material used is the same as that of the read pole because of its magnetic properties.

This second pole consists of a stack of 30 periods of 30 nm of sendust and of 20 nm of silicon nitride. As well as increasing the deposition time, this structure makes, it possible to reduce the shrinkage of this pole during passage of the tape. This second pole 9 is therefore made of an artificial material combining the magnetic properties of the sendust and the abrasion-resistant properties of the silicon nitride.

Next, an $Si_3N_4$ layer of about a few micrometers' thickness whose role is to protect all of the coatings, is deposited. All of this is then introduced into an annealing furnace in a magnetic field making it possible to improve the magnetic properties of the component (decrease the coercive field and induce magnetic anisotropy in the read and flux closure poles).

Next come the various steps of cutting and of polishing the prisms. We start by cutting the substrate into bars of 5 mm width then we procede to polishing the various faces B, D corresponding respectively to the faces for exit and for total reflection of the beam, then we produce the flat M by polishing on abrasive strips.

FIGS. 7a, 7b show a variant embodiment of the invention in which a backplate 66 is provided in order to ensure correct contact of the read layers (9, 10, 11) with the tape. This backplate may be adhesively bonded to the magnetic layer 11 or to the protective layer 10b.

In this way, a stack of layers, as shown in FIG. 7a, is obtained, which makes it possible to produce, for example, the read head of FIG. 7b.

The role of this backplate, which can be considered as a second substrate, is, on the one hand, to increase the width of the flat in contact with the tape, on the other hand, to locate the layers 9, 10, 11 of the head in the center of the active face (flat M), reducing the rate of wear of the flat M and simplifying the positioning and holding of the head on the medium, as will be explained below.

We will now explain the function of the backplate 66.

This backplate makes it possible to produce a geometry of the flat which makes it possible to improve the contact and the adjustment of the head on the magnetic tape and to considerably reduce the manufacturing constraints bearing on the tolerances of that part of the read head in contact with the tape.

Figure 8A:
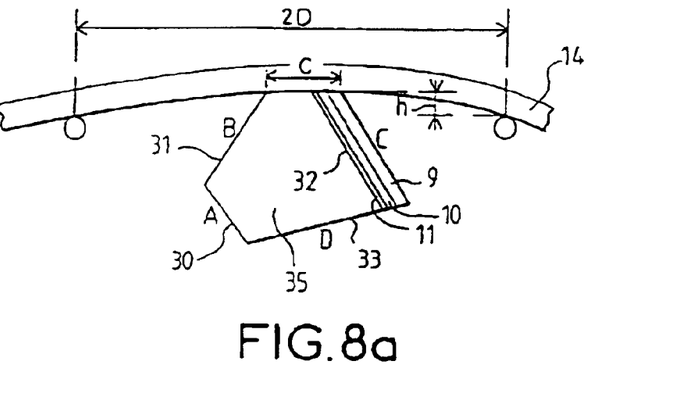
FIGS. 8 to 11 show an embodiment of the read head enabling the head structure to be made symmetric.
Figure 8B:
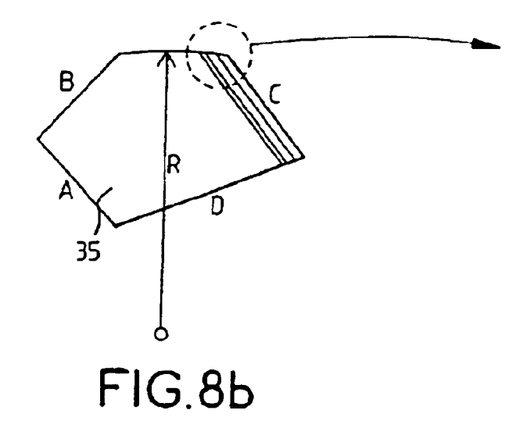
Figure 8C:
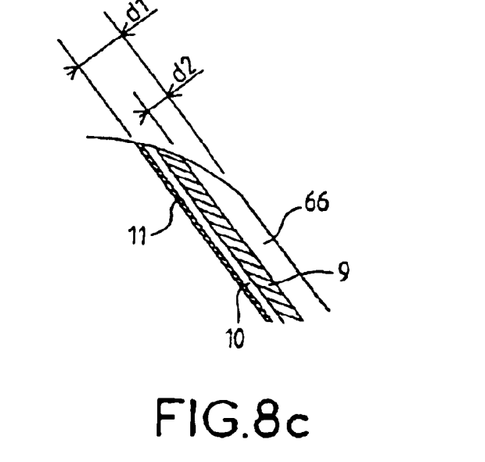

In the present heads, the main parameters and elements characterizing the contact of the head with the magnetic tape are as follows (FIGS. 8a to 8c):

For the system:
the wrap angle a, of about 0.5°,
the distance 2D separating the guides, about 10 mm,
the insertion h of the head in the tape, about 50 μm,
the tension T of the tape.
For the flat:
the width C, about 100 μm,
the radius of curvature R about 5 mm,
its composition, which consists of materials of different thickness and hardness,
the position of the active zone of the head on is the flat, the shielding/closure of the flux and read poles being at distances d2 and d1 of 3 and to 5 μm from the edge of the flat, respectively.

Its various parameters are not independent and are linked by the following equations:

$$h=Da$$

$$C=2Ra$$

Given the constraints linked to the size of the system (parameter D), to the production of the flat (parameters R and C), and to the quality of the contact (parameters a and h), the values given above are a good compromise (D, a and h).

However, this geometry has the following major drawbacks:
relating to the contact:
One of the first problems is linked to the fact that the magnetic layers are at the end (FIG. 1c) of the flat. This device makes the positioning of the head on the tape (parameters h, D and w) critical and imposes strict tolerances on the manufacture of the flat (parameters R and C).

Figure 9A:
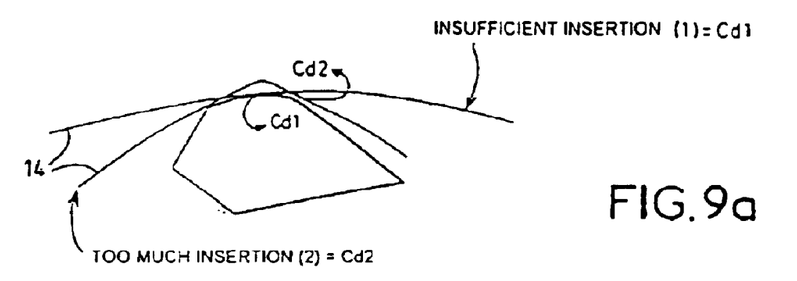
Figure 9B:
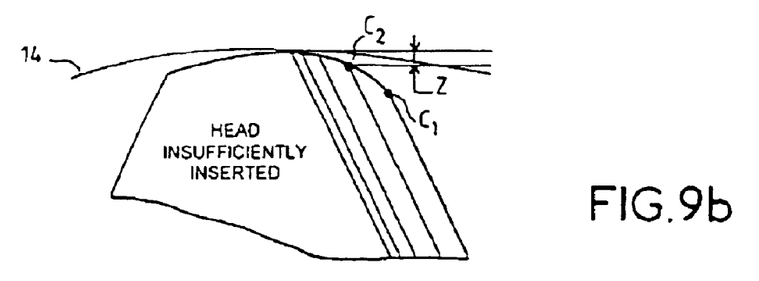

Let us evaluate these restrictions. Let us calculate firstly the range of value in which the insertion h of the head in the tape must be located in order for there to be contact. In FIGS. 9a–9b, we see that if the insertion h is not enough, there will be no contact with the active zone, on the other hand, if it is too much, the tape will protrude over the edges of the flat, the pressure then exerted by the tape will be much higher in the contact zone which will lead to accelerated wear of the portion of the flat in contact with the tape. Thus, the last point of contact Cd, Cd1 and Cd2 between the tape and the flat must be between the points C1 and C2, this defines two contact widths of the tape with the flat, that is C and C-2 d2. The insertion h associated with this range is calculated easily using the above formulae and we obtain:

$$h=CD/2R\ (1-d2/C)\pm Dd2/2R=h_{med}\pm h_{int}$$

$h_{med}$ is the nominal value of the insertion, $h_{int}$ is the margin of adjustment over this insertion and must be less than the uncertainties in adjustment and manufacture. Let us evaluate these various uncertainties.

uncertainty in manufacture of the flat:

$$h_{fab}=CD/2R\ (Ri/R+Ci/C)$$

uncertainty in positioning the head:
laterally: $h_{lat}$: CD/2R Di/D
angularly: $h_{ang}$=D wi
insertion: $h_{iz}$ that is: $h_{pos}=CD/2R\ Di/D+h_{iz}+D\ wi$ We therefore obtain the following equation:

$$CD/2R\ Di/D+h_{iz}+D\ wi+CD/2R\ (Ri/R+Ci/C)<Dd2/2R$$

with the above data, we obtain hint=1.5 μm

If we assume that we are capable of guaranteeing slopes at close to 1% for the flat, (which corresponds to a tolerance of 50 μm on the radius of curvature and of 1 μm on the width), we obtain a value for $h_{fab}$ of 1 μm, which means that it is necessary to guarantee the positioning of the head at 0.5 μm, which is extremely difficult to obtain. In practice, it is tolerable for there to be a space z between the head and the tape. This space introduces a loss p of the signal, the expression in dB for which is:

$$p=55\ z/Im=55\ d^2/R/Im\ \text{that is}\ d=V(p\ R\ Im/55)$$

where d is the distance from the last point of the tape in contact with the flat and Im the electromagnetic wavelength of the signal to be read, the values being given in microns.

If we accept a loss of 1 dB on the signal read at 0.8 μm, we obtain d=8.5 μm. The adjustment margin $h_{int}$ is then 5 μm. In spite of that, in order to be in the desired operating zone, it must be possible to reposition the head with an accuracy of insertion of 1 μm and over the azimuth of 2' and to keep the tape in front of the active part of the head in the same zone of variation ($h_{tape}$<1 μm) as it passes, which requires accurate and therefore expensive mechanisms.

We therefore see that in this geometry, to produce a correct contact with the tape will result in high manufacturing costs of the component and in improved mechanisms, even though a loss of 1 dB on the signal is tolerated.

Figure 10:
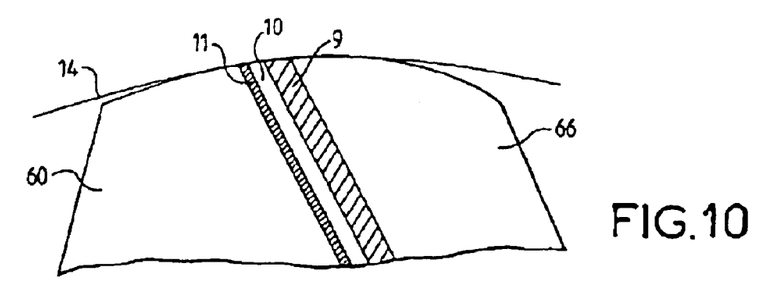
Figure 11:
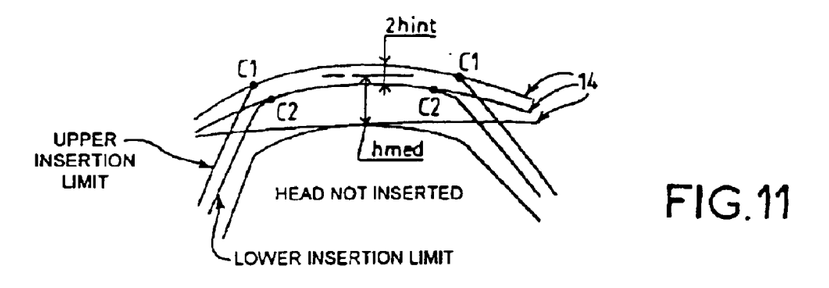

According to the invention, in order to relax the manufacturing and positioning constraints of the head, the position of the active layers is made symmetric with respect to the edges of the flat (FIG. 10). We achieve this by adhesively bonding a backplate 66 of the same type as the substrate 60 onto the layers. In FIG. 10, we can see that the adjustment margin hint can be chosen so as to make the constraints bearing on the accuracy of the adjustment of the head with respect to the tape and on the tolerances for producing the flat as small as necessary. For example, for a flat of 1500 μm, whose contact surface with the tape is between 500 ∞m and 1100 μm, we obtain an adjustment margin hint on the insertion of ±150 μm, and this without loss of signal and without the tape rubbing on the edge of the flat, which also makes it possible to relax the quality of polishing in this zone (bearable glare).

According to a variant embodiment of the read head according to the invention, it is possible to insert between the substrate 60 and the magnetooptic layer 11, a silicon layer making it possible to improve the coupling of the read beam in the magnetooptic layer 11. Experimentally, a doubling of the merit factor of the read head is noted, making it possible for the read rate to increase by a factor of four. This improvement can be applied per se to a magnetooptic read head independently of the rest of the invention. Similarly, the invention could be applied to a magnetooptic medium in which the magnetooptic layer would be produced on a silicon layer.

According to another variant, in order to maximize the magnetooptic merit factor as a function of the size of the airgap of the read head, the value of the refractive index of the airgap 10 material can be adjusted by varying the concentration of nitrogen during sputtering, making it possible to set the magnetooptic resonance peak over the deposited thickness. It is thus possible to make the index of the airgap layer vary continuously between 3.7 and 2, the material passing progressively from the silicon composition alone to silicon nitride.

What is claimed is:

1. A magnetooptic read head, comprising:
   a magnetooptic transducer with a multilayer structure with at least one thin magnetic layer with a magnetooptic effect;
   at least one layer of a nonmagnetic material and having a predetermined wear coefficient greater than a wear coefficient of the multilayer structure;
   a layer with a predetermined magnetic permeability configured to close a magnetic circuit, wherein said at least one layer of a nonmagnetic material is located between said layer with a predetermined magnetic permeability and said at least one thin magnetic layer with a magnetooptic effect; and
   a reflecting layer located between the at least one layer of a nonmagnetic material and the layer with the predetermined magnetic permeability,
   wherein the layer with the predetermined magnetic permeability comprises a first plurality of sublayers made of a magnetic material with the predetermined magnetic permeability and a second plurality of sublayers made of a material having a wear coefficient substantially equivalent to said wear coefficient of the at least one layer of a nonmagnetic material, and
   sublayers of said first plurality of sublayers alternate with sublayers of said second plurality of sublayers.

2. The read head as claimed in claim 1, wherein the first plurality of sublayers are made of a material similar to that of the at least one thin magnetic layer with the magnetooptic effect.

3. The read head as claimed in claim 1, wherein the second plurality of sublayers are made of a material similar to that of the at least one layer of the nonmagnetic material.

4. The read head as claimed in claim 2, wherein the at least one thin magnetic layer with the magnetooptic effect is made of a material based on iron, silicon and aluminum ($Fe_xSi_yAl_z$) or based on iron, tantalum and nitrogen ($Fe_xTa_yN_z$).

5. The read head as claimed in claim 3, wherein the at least one layer of the nonmagnetic material is made of a material based on silicon and nitrogen ($Si_xN_y$).

6. The read head as claimed in claim 1, wherein a total thickness of the first plurality of sublayers is less than a diameter of particles produced by a wear of materials of the read head or of a medium to be read.

7. The read head as claimed in claim 6, wherein the total thickness of the first plurality of sublayers is between 10 and 50 nm.

8. The read head as claimed in claim 7, wherein a total thickness of the second plurality of sublayers is between 10 and 30 nm.

9. A magnetooptic read head, comprising:
   a magnetooptic transducer with a multilayer structure with at least one thin magnetic layer with a magnetooptic effect;
   at least one layer of a nonmagnetic material and having a predetermined wear coefficient greater than a wear coefficient of the multilayer structure; and
   a layer with a predetermined magnetic permeability configured to close a magnetic circuit, wherein said at least one layer of a nonmagnetic material is located between said layer with a predetermined magnetic permeability and said at least one thin magnetic layer with a magnetooptic effect,
   wherein the layer with the predetermined magnetic permeability comprises a first plurality of sublayers made of a magnetic material with the predetermined magnetic permeability and a second plurality of sublayers made of a material having a wear coefficient substantially equivalent to said wear coefficient of the at least one layer of a nonmagnetic material, and
   about 30 sublayers of said first plurality of sublayers that alternate with about 30 sublayers of said second plurality of sublayers.

10. The read head as claimed in claim 1, wherein the reflecting layer is made of gold or of copper.

11. The read head as claimed in claim 1, further comprising a layer of an optical coupling material placed against the at least one thin magnetic layer with a the magnetooptic effect.

12. The read head as claimed in claim 11, wherein the optical coupling layer is made of silicon.

13. The read head as claimed in claim 1, wherein the layer with the predetermined magnetic permeability is coated with a protective layer on its a face that faces away from the at least one layer of the nonmagnetic material.

14. The read head as claimed in claim 13, wherein the protective layer is made of $Si_xN_y$.

15. The read head as claimed in claim 1, further comprising a backplate adhesively bonded to the layer with the predetermined magnetic permeability or to a protective layer that coats a face of the layer with the predetermined magnetic permeability.

16. The read head as claimed in claim 15, wherein the at least one thin magnetic layer with the magnetooptic effect is supported by a substrate and a thickness of the backplate is substantially equal to a thickness of the substrate.

\* \* \* \* \*